3,477,037
LASER DEVICE EMPLOYING FLUID MATERIAL FOR PRODUCING HIGH EFFICIENCY LASER BEAM

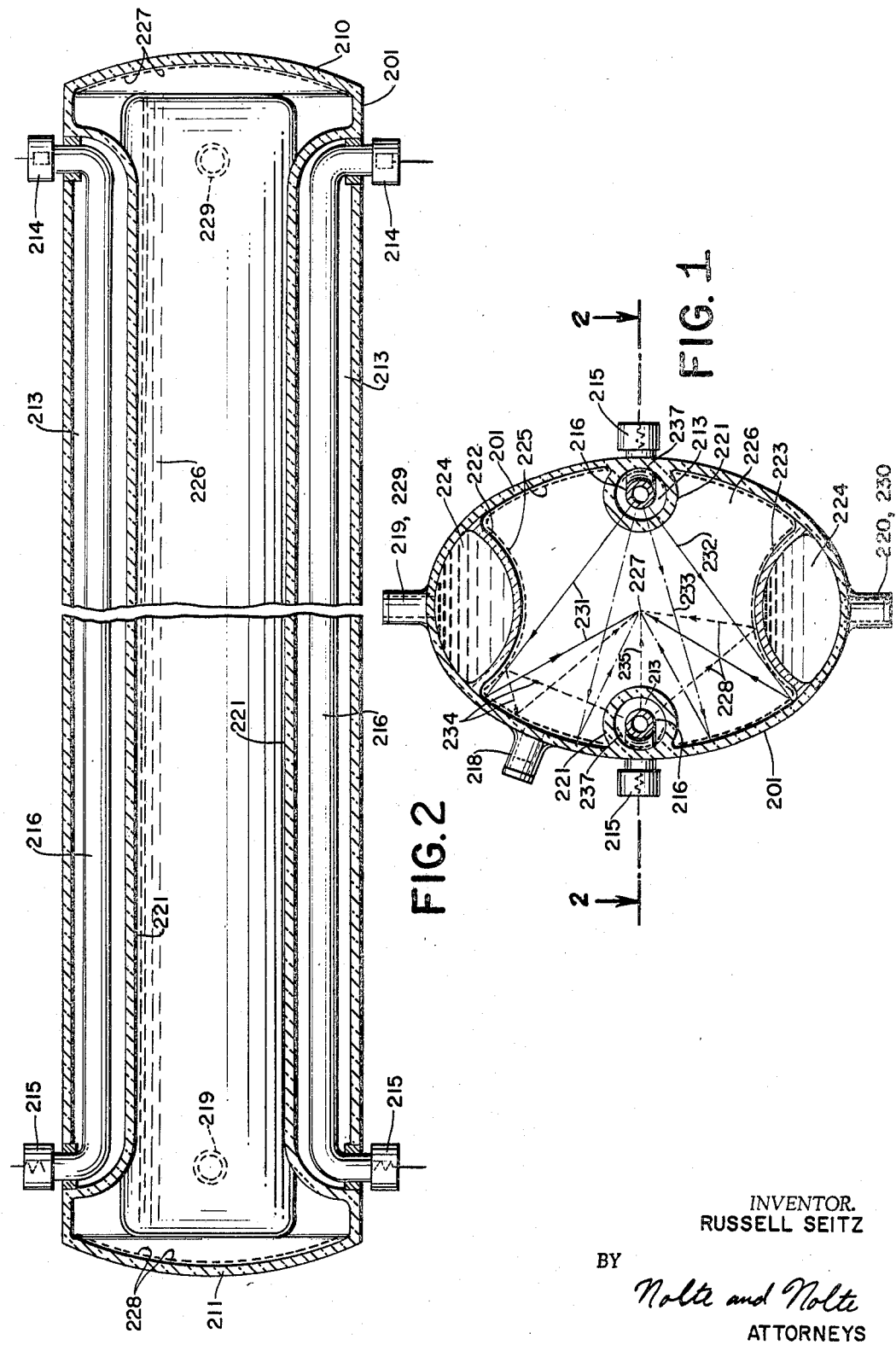

Russell Seitz, Elberon, N.J., assignor, by mesne assignments, of one-third to Elton Industries, Inc., Oyster Bay Cove, N.Y., a corporation of New York
Continuation-in-part of application Ser. No. 468,275, June 30, 1965. This application Sept. 24, 1965, Ser. No. 494,297
Int. Cl. H01s 3/20
U.S. Cl. 331—94.5    4 Claims

ABSTRACT OF THE DISCLOSURE

The laser device comprises an elongated hollow body of oval configuration containing a laser effect producing liquid, such as europium III benzoylacetonate. A pair of high intensity flash tubes extend opposite to each other within the body in optical contact with the laser liquid. The vertex areas within the body are provided with curved partitions creating elongated channels for cooling liquid. The inner surfaces of the oval body and of the curved partitions are covered with a reflective coating to focus light energy from the flash tubes into the optical axis of the laser liquid.

---

This applicaton is a continuation-in-part of application Ser. No. 468,275, filed June 30, 1965 and now abandoned.

This invention relates to laser devices and more particularly to an improved high efficiency liquid laser.

Under the present operation of lasers, the lasing operation is initiated by an intense light beam of short duration. Such a beam of light is produced by flash tubes whose operation can be timed precisely by an electric signal supplied to the flash tube. It has been found that where flash tubes or the like are used for initiating the lasing operation, that much of the light beam dissipates in the form of heat and is not used in the lasing operation. As a result, large high-power flash tubes must be employed to drive the laser so that sufficient light energy enters the laser element to produce the laser effect. These high energy flash tubes cause excessive heating of the laser elements and the flash tubes after repeated operations and thereby prevent continuous operation. To prevent this heat from limiting the laser operation, means must be provided to cool the laser so that the lasing element is not damaged by boiling as in the case of a liquid lasing element, or heat shock to the lasing element and the flash tubes.

It is an object of the present invention to provide a new and improved laser construction in which optimum utilization of the initiating light source is used so as to reduce the required energy and cooling means required for successful operation of the laser.

Another object of this invention is to provide a laser construction in which both the initiating light source and cooling elements are made an integral part of the laser instead of being separate and apart from the laser as is true in many presently known laser constructions.

Under the present invention, two flash tubes, which are energized simultaneously, are placed within a hollowed portion of the laser. The laser body is made of a quartz tube having a silver coating placed on the entire inner surface thereof. The laser has a nearly ellipsoid shape and two oppositely disposed ovate portions, extending longitudinally along the inner portion of the laser. The walls of the inner ovate portions are similarly made of quartz and are coated with silver. The flash tubes similarly extend longitudinally along the inner walls of the body throughout the length of the laser and are separate from the ovate portions. The flash tubes are separated from a liquid lasing element which is placed in the interior portion of the laser body by an isolating chamber which contains either a vacuum or cooling gases so that the heat produced by the flash tubes is insulated from the liquid lasing material.

The laser is so designed that the light produced by the flash tubes is transmitted to the lasing liquid with substantially no loss through dispersion. The laser body is so formed that all light beams leaving the flash tubes are reflected off the inner surface of the laser to focus at the center of the lasing element, thereby providing an intense source of light at the lasing center. Since a higher percentage of the energy from the flash tubes is utilized, it is possible to operate the laser with smaller flash tubes and significantly reduce the cooling requirements.

The laser is cooled by allowing a fluid to flow through the hollow chambers created by the ovate portions along the length of the laser body. By making the cooling area integral with the laser, a greater efficiency of cooling is established and the requirement for large cooling equipment is considerably reduced.

A fuller understanding of the objects and structure of this invention may be had from the specification below taken in conjunction with the accompanying drawings, in which:

FIG. 1 is a sectional view taken through the laser showing the interior structure thereof; and FIG. 2 is a sectional view taken along line 2—2 of FIG. 1.

Referring to FIGURES 1 and 2, the body of laser 201 consists of an elliptically shaped chamber having a pair of longitudinally extending flash tubes secured along opposite internal walls of the body. The body portion is preferably constructed from a quartz or vicor tube having a cross sectional profile that has been shaped in accordance with a preferred and calculated design to provide high efficiency laser action as described in more detail herein.

A pair of ovate channels 222 and 223 are fused to the inner elongated walls of the body of the laser and extend throughout its entire length to form a pair of completely enclosed chambers 224 in which a cooling liquid may be circulated therethrough. The chambers 224 contain a pair of outlets 219 and 220, and a pair of inlets 229 and 230 to which a cooling fluid may be introduced and circulated substantially along the entire length of the laser body through chambers 224 before being removed through the outlets. Equally spaced between each of the chambers 224 and extending along the inner walls of the body of the laser 201 are a pair of flash tubes 216 concentrically enclosed within a pair of chambers 221. Each of the tubes 216 terminate at one end thereof, in a pair of cathodes 215, and at the other end in a pair of anodes 214 to which a high voltage may be applied thereacross sufficient to fire an inert gas contained within the tubes. Intermediate flash tubes 216 and chambers 221 is a hollow passageway 213 which serves to isolate the flash tubes from contact with the fluids contained within the laser body. Passageway 213 may be evacuated, or filled with an inert gas to reduce the thermal shock experienced by the quartz flash tubes during ignition. Secured to each end of the body of the laser are a pair of confocal reflectors 210 and 211 having reflective coatings 227 and 228 deposited on their inner surfaces designed to reflect the laser produced light energy back into the laser producing medium along a centrally located axis representing the geometric and optical axis of the laser. Confocal reflector 210 may be made 100% reflective by coating 227, whereas confocal reflector 211 may only be made partially reflective by coating 228 to permit a portion of the laser generated beam to be transmitted therethrough.

The laser body 201 is essentially a specially designed container for supporting a laser producing liquid which, when activated by an intense and concentrated light source, will produce the laser effect. The liquid 226 within the body of the laser is preferably a solution of a rare earth chelate such as europium III benzoylacetonate or europium III trifluorobenzoylacetonate, and may typically be in a solution having a concentration of approximately 2 moles. Flash tubes 216 are preferably filled with a gas from the inert gas family such as xenon, to produce a high intensity light when its electrodes 214 and 215 are coupled to a high voltage source.

The internal surfaces of the body of the laser are completely covered with a mirrored or silvered finish 225 except for chambers 221 surrounding the flash tubes. Ovate surfaces 222 and 223, as well as the internal surfaces of the body of the laser containing the mirrored finish, have been geometrically shaped so that substantially all of the light produced by flash tubes 216 is focused along optical axis 227 of the laser. This is accomplished by designing the inner walls of laser body 201, as well as ovate surfaces 223 and 222, according to a predetermined analytical geometric surface so that all of the light produced by flash tubes 216 passes through axis 227 either directly or by reflection. The mathematical calculations used to compute the geometric design of the internal portion of the laser were derived from observence of Snell's law with respect to the spacing of the flash tubes and wound unnecessarily complicate the specification if presented herein.

The focusing of the light along axis 227 can be best illustrated by observing the travel of a plurailty of the light beams produced by each of the flash tubes. The light produced by flash tubes 216 may directly pass through axis 227 as shown by beam 236 in FIG. 1. The light may also be reflected from the reflective coating 225 on ovate surfaces 223 as shown by beam 228 and pass directly through axis 227. Moreover the light may be reflected from the laser body 201 as shown by beam 232 and pass through the axis 227. Where the light produced strikes the reflective surfaces adjacent to the intersection of the ovate surfaces and the side walls of the body, multiple reflections are possible as illustrated by light beam 234 reflecting off both the ovate surface and the inner wall of the laser body before passing through the axis 227.

The inner wall of chamber 221 surrounding the flash tubes 216 may also contain a reflective coating 237 deposited on that part of its inner surface adjacent to the side walls of the laser body, to further reflect the light energy which would normally be lost if allowed to pass out of the laser body. Reflective coating 237 thus serves to cause the light reflected therefrom to pass back toward the axis 227 of the laser. Thus it can be seen that substantially all of the light produced by flash tubes 216 is reflected and focused to provide a high intensity light source along the optical axis of the laser. It has been found that by employing this unique way of focusing the laser pump energy, substantially less light energy and smaller flash tubes may be employed to produce the desired laser action. Moreover, by employing confocal lenses 210 and 211 secured to the ends of the laser body, the laser action may be additionally enhanced by permitting the laser light generated by laser fluid 226 to be reflected back into the fluid of the laser and focused along its optical axis 227 to further enhance the energy buildup required to produce the high intensity laser beam. The laser beam produced along optical axis 227 is then transmitted through the partially silvered confocal reflector 211 and emerges as an extremely narrow beam of monochromatic light of high intensity. The advantages of employing this construction of the laser in conjunction with the liquid laser material over that of solid lasers using crystalline laser material, is that the width of the laser beam is not a function of the diameter of the laser material. Thus in solid lasers, the energy produced is distributed across a finite area of the beam corresponding to the cross-sectional area of the laser crystal. However, in the apparatus according to the present invention the width of the beam is not limited to the cross-sectional area of the laser producing material but only to the optical precision to which the pump energy may be focused along optical axis 227. Thus it is possible through careful design of the reflective surfaces within laser body 201 to produce an extremely narrow high intensity laser beam for industrial and commercial purposes.

The body of the laser may be constructed relatively inexpensively by employing conventional quartz and glass forming dies and by using known techniques to fuse the ovate surfaces and the flash tubes within the body. The reflective coatings 225 within the body of the laser may be added after its construction. The confocal reflectors are than cemented and sealed against the ends of the body of the laser before the liquid material is inserted therein. Because of its high efficiency, the laser according to this invention may be operated by low power high voltage source equipment that is relatively inexpensive to purchase.

It is also with the scope of this invention to provide a liquid laser apparatus having three or more ovate surfaces, symmetrically positioned within the body of the laser and to locate a plurality of flash tubes either symmetrically between the ovate surfaces or otherwise so that substantially all of the light produced by the flash tubes will be reflected from the ovate surfaces and from the reflective surfaces of the body of the laser to pass through a common axis defining the optical axis of the laser body. Accordingly, the shape of the body of the laser as well as the ovate surfaces placed therein would be empirically designed in agreement with the placement of the flash tubes so that substantially all of the light produced thereby will be focused along a common axis.

While only a single embodiment of the present invention has been shown and described, it will be understood that many changes and modifications may be made therein without departing from the spirit of the invention as defined by the appended claims.

What I claim is:
1. A device for producing a high intensity laser beam along its optical axis employing a fluid laser material comprising;
   a hollow cylindrically shaped body member having a highly reflective surface deposited on the inner wall thereof,
   a plurality of reflective ovate surfaces symmetrically disposed within said body member and extending longitudinally of said body member,
   high intensity light means for energizing the laser fluid equally spaced intermediate said ovate surfaces within said body member,
   means coupled to one end of said body member for reflecting said laser beam along the optical axis of the body member, and
   partially reflecting means connected to the opposite end of said body member for reflecting part of said laser energy back along its optical axis and for trans- mitting the laser beam therethrough, said body member and ovate surfaces being shaped so that substantially all of the light energy produced by said high intensity light means will be focused along a common axis defining the optical axis of said body member.

2. The device as recited in claim 1 wherein said light means comprises at least one flash tube longitudinally displaced along the inner walls of said body member intermediate said ovate surfaces.

3. The device as recited in claim 2, wherein said light producing means additionally comprises a protective chamber concentrically disposed around each of said flash tubes for thermally isolating the flash tubes from the fluid within the body of the laser.

4. The device as recited in claim 1 additionally comprising means for providing a cooling fluid intermediate the ovate surfaces and the body of the laser to cool the laser during its period of operation.

References Cited

UNITED STATES PATENTS 3,356,966  12/1967  Miller.

FOREIGN PATENTS 966,455  8/1964  Great Britain.

JEWELL H. PEDERSEN, Primary Examiner

WILLIAM L. SIKES, Assistant Examiner